(12) United States Patent
Kareis

(10) Patent No.: US 10,150,683 B2
(45) Date of Patent: Dec. 11, 2018

(54) DECHLORINATION COMPOSITIONS, COMPRESSED SOLIDS FORMED THEREFROM, AND METHODS OF PREPARING THE SAME

(71) Applicant: Axiall Ohio Inc., Atlanta, GA (US)

(72) Inventor: Christopher M. Kareis, Monroeville, PA (US)

(73) Assignee: EAGLE US 2 LLC, Houston, TX (US)

( * ) Notice: Subject to any disclaimer, the term of this patent is extended or adjusted under 35 U.S.C. 154(b) by 81 days.

(21) Appl. No.: 15/217,312

(22) Filed: Jul. 22, 2016

(65) Prior Publication Data

US 2017/0022077 A1   Jan. 26, 2017

Related U.S. Application Data

(60) Provisional application No. 62/196,366, filed on Jul. 24, 2015.

(51) Int. Cl.
*C02F 1/68*    (2006.01)
*C02F 1/70*    (2006.01)
*C02F 1/76*    (2006.01)
*C02F 101/12*  (2006.01)

(52) U.S. Cl.
CPC .......... *C02F 1/68* (2013.01); *C02F 1/76* (2013.01); *C02F 1/70* (2013.01); *C02F 2101/12* (2013.01); *C02F 2303/185* (2013.01)

(58) Field of Classification Search
None
See application file for complete search history.

(56) References Cited

U.S. PATENT DOCUMENTS

| | | |
|---|---|---|
| 3,260,674 A | 7/1966 | Ross |
| 4,226,939 A * | 10/1980 | Wegner .................. C12N 1/00 435/247 |
| 4,642,234 A * | 2/1987 | Davies .................. A61L 12/141 424/606 |
| 4,816,177 A * | 3/1989 | Nelson ................... C02F 1/688 106/157.5 |
| 5,192,571 A | 3/1993 | Levy |
| 6,221,257 B1 | 4/2001 | Grim |
| 6,294,096 B1 * | 9/2001 | Pate ........................ C02F 1/688 210/198.1 |
| 6,402,984 B1 | 6/2002 | Nakajima et al. |
| 6,472,198 B1 | 10/2002 | Semprini et al. |
| 6,689,326 B1 | 2/2004 | Jackson |
| 7,682,513 B2 | 3/2010 | Wang |
| 8,147,673 B2 | 4/2012 | Childers, II et al. |
| 8,449,778 B2 | 5/2013 | Gong et al. |
| 2005/0139805 A1 | 6/2005 | Koster |
| 2006/0065606 A1 | 3/2006 | McGuire |
| 2006/0102874 A1 | 5/2006 | Zheng |
| 2007/0000846 A1 * | 1/2007 | Boudenne ................ C02F 1/68 210/749 |
| 2008/0017584 A1 | 1/2008 | Reimann-Philipp |
| 2008/0073291 A1 | 3/2008 | Ritter |
| 2010/0072144 A1 | 3/2010 | Osakabe et al. |
| 2010/0084336 A1 | 4/2010 | Lee et al. |
| 2010/0122913 A1 * | 5/2010 | Matousek ................ C02F 9/00 205/743 |
| 2010/0147776 A1 | 6/2010 | Hojjatie et al. |
| 2012/0108426 A1 | 5/2012 | Gong et al. |
| 2012/0138516 A1 | 6/2012 | Childers, II et al. |
| 2013/0020265 A1 * | 1/2013 | Kamatsuchi ............. C02F 1/70 210/757 |
| 2014/0102978 A1 | 4/2014 | Smith et al. |
| 2014/0308371 A1 | 10/2014 | Parasida et al. |
| 2014/0332474 A1 | 11/2014 | Fouchet |
| 2015/0129475 A1 * | 5/2015 | Pickens .................. C02F 1/688 210/198.1 |
| 2017/0022076 A1 * | 1/2017 | Kareis ..................... C02F 1/68 |
| 2017/0022077 A1 * | 1/2017 | Kareis ..................... C02F 1/68 |

FOREIGN PATENT DOCUMENTS

| | | |
|---|---|---|
| CA | 1230825 A | 12/1987 |
| JP | 2002346575 A | 12/2002 |
| WO | 0126622 A1 | 4/2001 |

OTHER PUBLICATIONS

Fan et al.; "A Bulk Boron-Based Photocatalyst for Efficient Dechlorination: $K_3B_6O_{10}Br$"; Chemistry of Materials; 2014; pp. 3169-3174; vol. 26:10.

Helz et al.; "Dechlorination of wastewater and cooling water"; Environmental Science & Technology; 1984; pp. 48A-55A; vol. 18:2.

* cited by examiner

*Primary Examiner* — Joseph D Anthony
(74) *Attorney, Agent, or Firm* — The Webb Law Firm

(57) ABSTRACT

A dechlorination composition for dechlorinating water, such as treated water, includes at least one alkali metal sulfite, at least one alkali metal thiosulfate, at least one hydrogenated vegetable oil, and at least one saccharide. The dechlorination composition can also include at least one colorant and at least one halide salt. The dechlorination composition can be formed into a compressed solid. Methods of preparing compressed solids of dechlorination compositions are also disclosed.

20 Claims, No Drawings

DECHLORINATION COMPOSITIONS, COMPRESSED SOLIDS FORMED THEREFROM, AND METHODS OF PREPARING THE SAME

CROSS REFERENCE TO RELATED APPLICATIONS

This application claims the benefit of U.S. Provisional Patent Application No. 62/196,366, filed Jul. 24, 2015, which is incorporated herein by reference in its entirety.

BACKGROUND OF THE INVENTION

Field of the Invention

The present invention relates to dechlorination compositions, compressed solids prepared from such compositions, and methods of forming dechlorination compressed solids.

Description of Related Art

Chlorine, in a formal +1 oxidation state (e.g. hypochlorous acid or hypochlorite anion) and simply called chlorine herein, is the most commonly used disinfectant in water and wastewater treatment processes. While chlorination is an effective, versatile, and cost-effective means of limiting the spread of waterborne illness, moderate chlorine concentrations can also kill various aquatic life-forms. Because of this adverse effect, governmental agencies have established regulations that limit the amount of chlorine that can be present in treated water discharged into the environment, such as into lakes or rivers.

To comply with governmental regulations, a dechlorination step is implemented to neutralize the residual chlorine. One method of dechlorinating treated water includes adding a dechlorination composition that neutralizes the residual chlorine. For small and moderate scale operations, dechlorination compositions are commonly formed into tablets or pellets so that the dechlorination compositions slowly dissolve and interact with the residual chlorine dispersed throughout the treated water. Currently available dechlorination compositions generally require considerable processing (such as heating), which can have an adverse impact on manufacturing throughput and costs. For instance, some procedures blend sodium sulfite powder with calcium caseinate and water. The mixture is then either pressed into tablets and subsequently air-dried; or the moist mixture is granulated, dried, regranulated, and finally formed into tablets. Other current processes blend various ingredients with a liquid binder, press the mixture to form a tablet, and dry the formed tablet at elevated temperatures for over an hour. Other dechlorination compositions exist, but they involve similarly costly processing steps, such as baking. As such, there is a need for new dechlorination compositions that can be formed into solid objects, such as tablets, without the need for cumbersome processing steps.

SUMMARY OF THE INVENTION

In some examples, a dechlorination composition comprises at least one alkali metal sulfite, at least one alkali metal thiosulfate, at least one hydrogenated vegetable oil, and at least one saccharide. The alkali metal sulfite can comprise sodium sulfite, the alkali metal thiosulfate can comprise sodium thiosulfate having a hydration stoichiometry of 0 to 5 water molecules per unit formula of sodium thiosulfate, and the saccharide can comprise a monosaccharide and/or a polysaccharide having a stoichiometry of water molecules of greater than 0.

In certain examples, the alkali metal sulfite can comprise sodium sulfite. The alkali metal sulfite can also comprise at least 75 weight % of the total weight of the dechlorination composition, and can have an average particle size of 50 to 350 microns.

Further, in some examples, the alkali metal thiosulfate comprises sodium thiosulfate with a hydration stoichiometry of 0 to 5 water molecules per unit formula of sodium thiosulfate. The alkali metal thiosulfate can also comprise from 2 to 10 weight % of the total weight of the dechlorination composition, and can have an average particle size of 850 to 425 microns.

In certain examples, the hydrogenated vegetable oil comprises from 2 to 15 weight % of the total weight of the dechlorination composition. In addition, the saccharide can comprise a monosaccharide and/or a polysaccharide having a stoichiometry of water molecules of greater than 0. The saccharide can comprise from 0.1 to 10 weight % of the total weight of the dechlorination composition.

In some examples, the dechlorination composition can also include additional components. For example, the dechlorination compositions can also comprise at least one colorant and/or at least one halide salt such as an alkali and/or alkaline earth metal halide salt. In such examples, the colorant can comprise up to 1 weight % of the total weight of the dechlorination composition, and the halide salt can comprise up to 10 weight % of the total weight of the dechlorination composition.

The components that are used to form the dechlorination composition can be combined at various amounts and compressed to form a compressed solid including, but not limited to, a tablet, pellet, or granule.

In one non-limiting example, the dechlorination composition is a compressed solid and comprises: at least one alkali metal sulfite comprising at least 75 weight % of the total weight of the dechlorination composition; at least one alkali metal thiosulfate comprising from 2 to 10 weight % of the total weight of the dechlorination composition; at least one hydrogenated vegetable oil comprising from 2 to 15 weight % of the total weight of the dechlorination composition; and at least one saccharide comprising from 0.1 to 10 weight % of the total weight of the dechlorination composition. The dechlorination composition can also comprise at least one colorant comprising up to 1 weight % of the total weight of the dechlorination composition.

In certain examples, a method of preparing a dechlorination compressed solid is provided by a method comprising: mixing at least one alkali metal sulfite, at least one alkali metal thiosulfate, at least one hydrogenated vegetable oil, and at least one saccharide to form a dry blended composition; forming a compressed solid from the dry blended composition; and exposing the compressed solid to ambient conditions or a temperature above ambient conditions for a predetermined or set period of time. Any of the other additional components can also be mixed into the dry blended composition before compressing. In addition, the alkali metal sulfite can be milled to an average particle size of 50 microns to 350 microns prior to mixing it into the dry blended composition, and the alkali metal thiosulfate can be milled to an average particle size of 850 microns to 425 microns prior to mixing it into the dry blended composition.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, the present invention is directed to a dechlorination composition. As used herein, "dechlorination" refers to the process of removing residual chlorine from water, such as disinfected water. A "dechlorination composition" refers to a composition of chemical components in which at least some of the components are capable of reacting with residual chlorine to remove the chlorine from water, such as disinfected water. The term "residual chlorine" refers to both free available chlorine (e.g. hypochlorous acid and hypochlorite) and combined chlorine (e.g. various chloramines, such as monochloramine). Further, as used herein, "removal of chlorine from water" refers to the reduction of the oxidative state of free and combined chlorine such that the chlorine cannot be used as an oxidant.

Further, the dechlorination composition can be used in various forms, such as a compressed solid or non-compacted particles, for example. As used herein, a "compressed solid" refers to a mixture of dry components that are compacted and held together. Non-limiting examples of a compressed solid include a tablet, pellet, granule, or combinations thereof.

In some examples, the components used to prepare the dechlorination composition can comprise at least one alkali metal sulfite, such as, for example, sodium sulfite, potassium sulfite, rubidium sulfite, caesium sulfite, francium sulfite, or combinations thereof. The alkali metal sulfite can also be milled, such as with a QUADRO® COMIL® Model 196 milling device, to a desired particle size before mixing the alkali metal sulfite with additional components to form the dechlorination composition. For example, the alkali metal sulfite can be ground to an average particle size ranging from 50 microns to 350 microns, from 100 microns to 300 microns, or from 150 microns to 250 microns. As used herein, "average particle size" refers to the size of 50 weight % or more of the particles in a sample. The average particle size can be determined using a sieve analysis test as known to those skilled in the art. The sieve analysis test for determining particle size is described in ASTM C136/C136M-14, which is incorporated by reference herein.

The alkali metal sulfite can comprise at least 75 weight % or at least 80 weight % of the dechlorination composition, based on the total weight of the composition. The alkali metal sulfite can comprise up to 85 weight %, up to 90 weight %, or up to 95 weight % of the dechlorination composition, based on the total weight of the composition. The alkali metal sulfite can also be added to the dechlorination composition within a range such as from 75 to 95 weight % or from 80 to 90 weight %, based on the total weight of the composition. It is appreciated that the amount of alkali metal sulfite in the dechlorination composition can be selected within a range of any of the end values previously described.

The dechlorination composition can also comprise at least one alkali metal thiosulfate, such as, for example, sodium thiosulfate, potassium thiosulfate, and combinations thereof. The alkali metal thiosulfate can be anhydrous or hydrated. For example, the alkali metal thiosulfate can have a hydration stoichiometry of 0 to 5 water molecules per unit formula of alkali metal thiosulfate, such as per unit formula of sodium thiosulfate. As used herein, "hydration stoichiometry of water molecules" refers to the amount of water molecules associated with a compound. A stoichiometry of zero ("0") water molecules refers to an anhydrous compound that is not associated with any water molecules, while a stoichiometry of water molecules of greater than 0 refers to a compound having water molecules associated therewith. A non-limiting example of a hydrated alkali metal thiosulfate is sodium thiosulfate pentahydrate, which is an alkali metal thiosulfate with a hydration stoichiometry of 5 water molecules per unit formula of alkali metal thio sulfate.

Moreover, the alkali metal thiosulfate used with the dechlorination composition can have an average particle of 850 microns to 425 microns, or from 710 microns to 500 microns, or from 650 microns to 550 microns. These particle sizes can be formed by milling the alkali metal thiosulfate such that the particles can pass through a 20 to 40 mesh sieve, a 25 to 35 mesh sieve, or a 30 mesh sieve.

The alkali metal thiosulfate, such as the alkali metal thiosulfates previously described, can be added to the dechlorination composition within a range such as from 1 to 20 weight %, from 2 to 10 weight %, from 3 to 8 weight %, or from 3 to 7 weight %, based on the total weight of the composition. It is appreciated that the amount of alkali metal thiosulfate in the dechlorination composition can be selected within a range of any of the end values previously described.

The alkali metal sulfite and alkali metal thiosulfate can be used together as the active ingredients in the dechlorination composition. As the active ingredients, the alkali metal sulfite and alkali metal thiosulfate can both help reduce residual chlorine found in water, such as disinfected water. It has been found that the combination of an alkali metal sulfite and an alkali metal thiosulfate effectively remove residual chlorine from water.

The dechlorination composition can also comprise one or more hydrogenated vegetable oils. The hydrogenated vegetable oil may be partially or fully hydrogenated. A "partially hydrogenated vegetable oil" refers to a vegetable oil that has been treated with hydrogen or a source of hydrogen to convert only a portion of the carbon-carbon double bonds into carbon-carbon single (saturated) bonds. In contrast, a "fully hydrogenated vegetable oil" refers to a vegetable oil that has been treated with hydrogen or a source of hydrogen to convert all of the carbon-carbon double bonds into carbon-carbon single (saturated) bonds.

Examples of hydrogenated vegetable oils include, but are not limited to, hydrogenated cottonseed oil, soybean oil, corn oil, peanut oil, palm oil, sunflower seed oil, or combinations thereof. A non-limiting example of a commercially available hydrogenated cottonseed oil includes LUBRI-TAB® from JRS PHARMA LP, USA. Other non-limiting examples of commercially available hydrogenated vegetable oils include those available from ABITEC under the trade name STEROTEX® such as: STEROTEX® K, NF; STEROTEX® HM, NF; and STEROTEX® NF.

Without being bound by theory, it is believed that the hydrogenated vegetable oil forms at least a portion of the binder and helps control the dissolution rate and/or provide a desired hardness when the compositions are formed into a compressed solid. As used herein, the "dissolution rate" refers to the time it takes for a portion of the compressed solid to dissolve in a solvent over a certain period of time, and the term "hardness" refers to the ability of a compressed solid to withstand a particular force without breaking in half across the diameter.

In some examples, the hydrogenated vegetable oil used with the dechlorination composition can also have an average particle size of 850 microns to 425 microns, or from 710 microns to 500 microns, or from 650 microns to 550 microns. These particle sizes can be formed by grinding, milling, mixing, or otherwise breaking up the hydrogenated vegetable oil such that the particles can pass through a 20 to 40 mesh sieve, a 25 to 35 mesh sieve, or a 30 mesh sieve.

The dechlorination composition can comprise from 2 to 15 weight %, from 4 to 12 weight %, or from 6 to 8 weight % of the hydrogenated vegetable oil, based on the total weight of the composition. It is appreciated that the amount of hydrogenated vegetable oil in the dechlorination composition can be selected within a range of any of the end values previously described.

The dechlorination composition can also comprise one or more other components. For example, the dechlorination composition can also comprise one or more other components that form at least a portion of the binder of the dechlorination composition. Non-limiting examples of other components that can be used with the dechlorination composition comprise one or more saccharides. The saccharides used with the dechlorination compositions can include monosaccharides and/or polysaccharides. As used herein, a "polysaccharide" refers to a molecule with two or more monosaccharide units linked together, such as a disaccharide, for example. Suitable saccharides that can be used with the dechlorination composition include, but are not limited to, glucose, dextrose, fructose, lactose, sucrose, maltose, and combinations thereof. The saccharide can also have a hydration stoichiometry of 0 to 5 water molecules per unit formula of saccharide. For example, the dechlorination composition can comprise a hydrated saccharide such as lactose monohydrate.

The saccharides can comprise at least 0.1 weight %, at least 0.5 weight %, at least 0.8 weight %, or at least 1 weight % of the dechlorination composition, based on the total weight of the composition. The saccharide can comprise up to 10 weight %, up to 5 weight %, up to 4 weight %, or up to 3 weight % of the dechlorination composition, based on the total weight of the composition. The saccharide can also be added to the dechlorination composition within a range such as, for example, from 0.1 to 10 weight %, from 0.1 to 5 weight %, from 0.5 to 4 weight %, or from 1 weight % to 3 weight %, based on the total weight of the composition. It is appreciated that the amount of saccharide in the dechlorination composition can be selected within a range of any of the end values previously described.

Another non-limiting example of a component that can form at least a portion of the binder of the dechlorination composition includes halide salts. The term "halide" refers to an anion of a halogen, and a "halide salt" refers to a salt having one or more anions of a halogen and at least one other atom that is not a halogen. The halide salts can include, but are not limited to, inorganic halide salts. An "inorganic halide salt" means a salt of an inorganic cation and which includes one or more halogen anions. Such inorganic halide salts can be selected from alkali and/or alkaline earth metal halide salts.

Non-limiting examples of suitable halide salts that can be used to prepare the dechlorination compositions described herein include sodium chloride, lithium chloride, potassium chloride, magnesium chloride, calcium chloride, sodium fluoride, lithium fluoride, potassium fluoride, magnesium fluoride, calcium fluoride, or combinations thereof.

The dechlorination composition can comprise up to 10 weight %, up to 5 weight %, up to 4 weight %, or up to 3 weight % of a halide salt, based on the total weight of the composition. The dechlorination compositions can also comprise from 0.1 to 10 weight %, from 0.1 to 5 weight %, from 0.5 to 4 weight %, or from 1 to 3 weight % of a halide salt, based on the total weight of the composition. It is appreciated that the amount of halide salt in the dechlorination composition can be selected within a range of any of the end values previously described.

The dechlorination composition can further comprise at least one colorant. As used herein, a "colorant" refers to any material that changes the color or appearance of the dechlorination composition. The colorant can include an environmentally acceptable food colorant such as a food grade colorant. A "food grade colorant" is a colorant that is suitable for use in products that are directly, or indirectly, intended for human or animal consumption including, but not limited to, water. A non-limiting example of a suitable commercially available food grade colorant includes Green Lake Blend, which is a blend of tartrazine aluminum lake and brilliant blue FCF aluminum lake, commercially available from Sensient Colors LLC.

The colorant can be added to the dechlorination composition in an amount sufficient to provide a desired visual appearance. To provide a particular visual appearance, the dechlorination composition can comprise up to 1 weight %, up to 0.5 weight %, or up to 0.1 weight % of a colorant, based on the total weight of the composition. The dechlorination compositions can also comprise from 0.01 to 1 weight %, or from 0.05 to 1 weight % of a colorant, based on the total weight of the composition. It is appreciated that the amount of colorant in the dechlorination composition can be selected within a range of any of the end values previously described.

As indicated, various combinations and amounts of the previously described components can be combined to form a compressed solid that when added to disinfected water reduces residual chlorine. The compressed solid of the present invention can be formed by first mixing the components of the dechlorination composition to form a dry blended composition, such as using a ribbon blender or similar device. As used herein, a "dry blended composition" refers to a homogenous mixture of dry materials. Further, and as previously described, the alkali metal sulfite and/or alkali metal thiosulfate can be milled to obtain a particular particle size prior to mixing.

After mixing, the dry blended composition can be compacted together to form a compressed solid. The dry blended composition can be compacted together using techniques known in the art including, but not limited to, direct compression, such as with a tablet press. The compressed solid can include, but is not limited to, a tablet, pellet, granule, or combinations thereof.

Next, the compressed solid can be exposed to ambient conditions for a set period of time. For example, the compressed solid can be exposed to ambient conditions for at least 1 day, at least 5 days, at least 7 days, at least 10 days, or at least 14 days. As used herein, "ambient conditions" refers to the temperature and pressure of the surrounding environment. The ambient conditions at which the compressed solid is exposed can include, but is not limited to, a temperature of −20° C. to 50° C. and a pressure of 0.5 atmospheres (atm) to 3 atm, or about 25° C. and 1 atm. Alternatively, heat can be applied to hasten the curing of the compressed solids. As used herein, "heating of the compressed solids" refers to a step of applying external heat to raise the temperature above ambient conditions, such as a temperature within a range of greater than 50° C. and up to 70° C. for example.

It was found that exposure to ambient conditions or heat helps form a compressed solid with a hardness that allows for normal shipping and handling without excessive fragmentation of the tablets, as well as desired dissolution rates to effectively remove residual chlorine from disinfected water. For instance, compressed solids with an average height of 22 mm or 2.2 cm, an average diameter of 2⅝ inches, an average weight of 160 grams, and an average density of 2 g/cm$^3$ can have a hardness (i.e., the ability of a compressed solid to withstand a particular force without breaking in half across the diameter) to withstand a force of 70 to 130 lbf (pound-force), or 80 to 120 lbf, or 90 to 110 lbf, without breaking in half across the diameter. The hardness is determined by applying different amounts of force from a Mecmesin force stand until the compressed solid breaks in half across the diameter.

Compressed solids having the dimensions and parameters previously described can also exhibit a dissolution rate of 15 to 30 grams per hour at 68° F., or 18 to 25 grams per hour at 68° F., when added to a single tube feeder with a flow rate of 3 gallons per minute of water. The dissolution rate is determined by weighing the tablet before adding it to the single tube feeder, placing the tablet in a single tube feeder, applying water with a flow rate of 3 gallons per minute at 68° F., removing the tablet after a predetermined amount of time, re-weighing the tablet, and then calculating the dissolution rate of the tablet based on the difference in weight per time period water was applied in the single tube feeder.

The following examples are presented to demonstrate the general principles of the invention. The invention should not be considered as limited to the specific examples presented. All parts and percentages in the examples are by weight unless otherwise indicated.

EXAMPLES 1-3

Preparation of a Dechlorination Composition

Three (3) dechlorination compositions, according to the present invention, were prepared from the components listed in Table 1.

TABLE 1

| Component | Example 1 Percentage by Weight (%) | Example 2 Percentage by Weight (%) | Example 3 Percentage by Weight (%) |
|---|---|---|---|
| Sodium Sulfite [1] | 85 | 85 | 85 |
| Sodium Thiosulfate Pentahydrate | 5 | 5 | 5 |
| LUBRITAB ® [2] | 8 | 8.5 | 9 |
| Lactose Monohydrate | 2 | 1.5 | 1 |
| Green Colorant [3] | Trace amount of less than 0.1% | Trace amount of less than 0.1% | Trace amount of less than 0.1% |

[1] Sodium sulfite having an average particle size of 50 to 350 microns.
[2] Hydrogenated cottonseed oil, commercially available from JRS Pharma.
[3] A blend of tartrazine aluminum lake and brilliant blue FCF aluminum, commercially available from Sensient Colors LLC.

In each of Examples 1-3, the sodium thiosulfate was first milled with a QUADRO® COMIL® Model 196 to a particle size that could pass through a 30 mesh sieve, which is equivalent to a particle size of about 595 microns. Further, the hydrogenated cottonseed oil (LUBRITAB®) was also broken up with a QUADRO® COMIL® Model 196 to form particles that could pass through a 30 mesh sieve.

The hydrogenated cottonseed oil (LUBRITAB®), lactose monohydrate, and green colorant were then combined in a ribbon blender and mixed for a period of 5 minutes with a ribbon blender. The sodium sulfite and sodium thiosulfate pentahydrate were added to the mixture of hydrogenated cottonseed oil (LUBRITAB®), lactose monohydrate, and green colorant. All the components were then mixed for an additional 5 minutes to form homogenous green powdered compositions.

EXAMPLE 4

Formation of Dechlorination Tablets

Approximately 160 grams of the homogenous green dechlorination compositions prepared in Examples 1-3 were placed into a hopper of a Baldwin 20 tablet press. After adding the homogenous green dechlorination compositions to the tablet press, approximately 50 tons of pressure for one second or less was applied to the powdered composition to form well-defined tablets. Each tablet had an average height of 22 mm or 2.2 cm, an average diameter of 2⅝ inches, an average weight of 160 grams, and an average density of 2 g/cm$^3$. The resulting tablets were then allowed to sit, undisturbed, for 14 days in ambient conditions.

The tablets formed from the homogenous green dechlorination compositions were then tested for hardness and dissolutions rate. The hardness of each tablet was determined by applying different amounts of force from a Mecmesin force stand until the tablet broke in half across the diameter. The dissolution rate was determined by weighing each tablet before adding it to a single tube feeder, placing the tablet in the single tube feeder, applying water with a flow rate of 3 gallons per minute at 68° F., removing the tablet after a predetermined amount of time, re-weighing the tablet, and then calculating the dissolution rate of the tablet based on the difference in weight per time period water was applied in the single tube feeder.

The hardness and dissolutions/rates are shown in Table 2.

TABLE 2

| Tablet | Dissolution Rate [3] (grams per hour at 68° F.) | Hardness [4] (lbf) |
| --- | --- | --- |
| Example 1 | 25 | 101 |
| Example 2 | 25.5 | 78 |
| Example 3 | 19 | 81 |

[3] Determined in a single tube feeder with a flow rate of 3 gallons per minute.
[4] Highest force each tablet could withstand without breaking in half across the diameter.

As shown in Table 2, the tablets of Examples 1-3 exhibited a sufficient hardness to withstand a force between 70 and 130 lbf without breaking in half across the diameter. The tablets also exhibited a dissolution rate between 15 and 30 grams per hour at 68° F. when added to a single tube feeder with a flow rate of 3 gallons per minute of water.

The present invention is also directed to the following clauses.

Clause 1

A dechlorination composition comprising at least one alkali metal sulfite, at least one alkali metal thiosulfate, at least one hydrogenated vegetable oil, and at least one saccharide.

Clause 2

The dechlorination composition of clause 1, further comprising at least one colorant.

Clause 3

The dechlorination composition of any of clauses 1-2, further comprising at least one halide salt.

Clause 4

The dechlorination composition of any of clauses 1-3, wherein the alkali metal sulfite comprises sodium sulfite.

Clause 5

The dechlorination composition of any of clauses 1-4, wherein the alkali metal sulfite comprises at least 75 weight % of the total weight of the dechlorination composition.

Clause 6

The dechlorination composition of any of clauses 1-5, wherein the alkali metal thiosulfate comprises sodium thiosulfate with a hydration stoichiometry of 0 to 5 water molecules per unit formula of sodium thiosulfate.

Clause 7

The dechlorination composition of any of clauses 1-6, wherein the alkali metal thiosulfate comprises from 2 to 10 weight % of the total weight of the dechlorination composition.

Clause 8

The dechlorination composition of any of clauses 1-7, wherein the hydrogenated vegetable oil comprises from 2 to 15 weight % of the total weight of the dechlorination composition.

Clause 9

The dechlorination composition of any of clauses 1-8, wherein the saccharide comprises a monosaccharide and/or a polysaccharide having a stoichiometry of water molecules of greater than 0.

Clause 10

The dechlorination composition of any of clauses 1-9, wherein the saccharide comprises from 0.1 to 10 weight % of the total weight of the dechlorination composition.

Clause 11

The dechlorination composition of any of clauses 3-10, wherein the halide salt comprises an alkali and/or alkaline earth metal halide salt.

Clause 12

The dechlorination composition of any of clauses 3-11, wherein the halide salt comprises up to 10 weight % of the total weight of the dechlorination composition.

Clause 13

The dechlorination composition of any of clauses 2-12, wherein the colorant comprises up to 1 weight % of the total weight of the dechlorination composition.

Clause 14

The dechlorination composition of any of clauses 1-13, wherein the alkali metal sulfite comprises an average particle size of 50 to 350 microns.

Clause 15

The dechlorination composition of any of clauses 1-14, wherein the alkali metal thiosulfate comprises an average particle size of 850 to 425 microns.

Clause 16

The dechlorination composition of any of clauses 1-15, wherein the dechlorination composition is a compressed solid.

Clause 17

A dechlorination composition comprising: at least one alkali metal sulfite comprising at least 75 weight % of the total weight of the dechlorination composition; at least one alkali metal thiosulfate comprising from 2 to 10 weight % of the total weight of the dechlorination composition; at least one hydrogenated vegetable oil comprising from 2 to 15 weight % of the total weight of the dechlorination composition; and at least one saccharide comprising from 0.1 to 10 weight % of the total weight of the dechlorination composition, wherein the dechlorination composition is a compressed solid.

Clause 18

The dechlorination composition of clause 17, further comprising at least one colorant comprising up to 1 weight % of the total weight of the dechlorination composition.

Clause 19

A method of preparing a dechlorination compressed solid comprising: a) mixing at least one alkali metal sulfite, at least one alkali metal thiosulfate, at least one hydrogenated vegetable oil, and at least one saccharide to form a dry blended composition; b) forming a compressed solid from the dry blended composition; and c) exposing the compressed solid to ambient conditions or a temperature above ambient conditions for a set period of time.

Clause 20

The method of clause 19, further comprising milling the alkali metal sulfite to an average particle size of 50 microns to 350 microns prior to step a).

Clause 21

The method of any of clauses 19-20, further comprising milling the alkali metal thiosulfate to an average particle size of 850 microns to 425 microns prior to step a).

Whereas particular embodiments and examples of this invention have been described above for purposes of illustration, it will be evident to those skilled in the art that numerous variations of the details of the present invention may be made without departing from the invention as defined in the appended claims.

The invention claimed is:

1. A dechlorination composition comprising at least one alkali metal sulfite, at least one alkali metal thiosulfate, at least one hydrogenated vegetable oil, and at least one saccharide, wherein the alkali metal thiosulfate comprises from 2 to 10 weight % of the total weight of the dechlorination composition.

2. The dechlorination composition of claim 1, wherein the alkali metal sulfite comprises sodium sulfite.

3. The dechlorination composition of claim 1, wherein the alkali metal sulfite comprises at least 75 weight % of the total weight of the dechlorination composition.

4. The dechlorination composition of claim 1, wherein the alkali metal sulfite comprises an average particle size of 50 to 350 microns.

5. The dechlorination composition of claim 1, wherein the alkali metal thiosulfate comprises sodium thiosulfate with a hydration stoichiometry of 0 to 5 water molecules per unit formula of sodium thiosulfate.

6. The dechlorination composition of claim 1, wherein the alkali metal thiosulfate comprises an average particle size of 850 to 425 microns.

7. The dechlorination composition of claim 1, wherein the hydrogenated vegetable oil comprises from 2 to 15 weight % of the total weight of the dechlorination composition.

8. The dechlorination composition of claim 1, wherein the saccharide comprises a monosaccharide and/or a polysaccharide having a stoichiometry of water molecules of greater than 0.

9. The dechlorination composition of claim 1, wherein the saccharide comprises from 0.1 to 10 weight % of the total weight of the dechlorination composition.

10. The dechlorination composition of claim 1, further comprising at least one colorant.

11. The dechlorination composition of claim 10, wherein the colorant comprises up to 1 weight % of the total weight of the dechlorination composition.

12. The dechlorination composition of claim 1, further comprising at least one halide salt.

13. The dechlorination composition of claim 12, wherein the halide salt comprises an alkali and/or alkaline earth metal halide salt.

14. The dechlorination composition of claim 12, wherein the halide salt comprises up to 10 weight % of the total weight of the dechlorination composition.

15. The dechlorination composition of claim 1, wherein the dechlorination composition is a compressed solid.

16. A dechlorination composition comprising:
    at least one alkali metal sulfite comprising at least 75 weight % of the total weight of the dechlorination composition;
    at least one alkali metal thiosulfate comprising from 2 to 10 weight % of the total weight of the dechlorination composition;
    at least one hydrogenated vegetable oil comprising from 2 to 15 weight % of the total weight of the dechlorination composition; and
    at least one saccharide comprising from 0.1 to 10 weight % of the total weight of the dechlorination composition,
    wherein the dechlorination composition is a compressed solid.

17. The dechlorination composition of claim 16, further comprising at least one colorant comprising up to 1 weight % of the total weight of the dechlorination composition.

18. A method of preparing a dechlorination compressed solid comprising:
    a) mixing at least one alkali metal sulfite, at least one alkali metal thiosulfate, at least one hydrogenated vegetable oil, and at least one saccharide to form a dry blended composition, wherein the alkali metal thiosulfate comprises from 2 to 10 weight % of the total weight of the dechlorination composition;
    b) forming a compressed solid from the dry blended composition; and
    c) exposing the compressed solid to ambient conditions or a temperature above ambient conditions for a set period of time.

19. The method of claim 18, further comprising milling the alkali metal sulfite to an average particle size of 50 microns to 350 microns prior to step a).

20. The method of claim 19, further comprising milling the alkali metal thiosulfate to an average particle size of 850 microns to 425 microns prior to step a).

* * * * *